Sept. 12, 1961 B. S. BENSON 2,999,315

GRAPH TRANSFORMATION APPARATUS

Filed April 24, 1953 9 Sheets-Sheet 1

BERNARD S. BENSON,
INVENTOR.

HUEBNER, BEEHLER,
WORREL & HERZIG,
ATTORNEYS.

BY Warren T. Jessup

Sept. 12, 1961 B. S. BENSON 2,999,315

GRAPH TRANSFORMATION APPARATUS

Filed April 24, 1953 9 Sheets-Sheet 2

BERNARD S. BENSON,
INVENTOR.

HUEBNER, BEEHLER,
WORREL & HERZIG,
ATTORNEYS.

BY Warren T. Jessup

Sept. 12, 1961 B. S. BENSON 2,999,315

GRAPH TRANSFORMATION APPARATUS

Filed April 24, 1953 9 Sheets-Sheet 3

BERNARD S. BENSON,
INVENTOR.

HUEBNER, BEEHLER,
WORREL & HERZIG,
ATTORNEYS.

BY Warren T. Jessup

BERNARD S. BENSON,
INVENTOR.

HUEBNER, BEEHLER,
WORREL & HERZIG,
ATTORNEYS.
BY Warren T. Jessup

BERNARD S. BENSON,
INVENTOR.
HUEBNER, BEEHLER,
WORREL & HERZIG,
ATTORNEYS.
BY Warren T. Jessup Sept. 12, 1961 B. S. BENSON 2,999,315

GRAPH TRANSFORMATION APPARATUS

Filed April 24, 1953 9 Sheets-Sheet 6

BERNARD S. BENSON,
INVENTOR.

HUEBNER, BEEHLER,
WORREL & HERZIG,
ATTORNEYS.

BY Warren T. Jessup

Sept. 12, 1961 B. S. BENSON 2,999,315
GRAPH TRANSFORMATION APPARATUS
Filed April 24, 1953 9 Sheets-Sheet 7
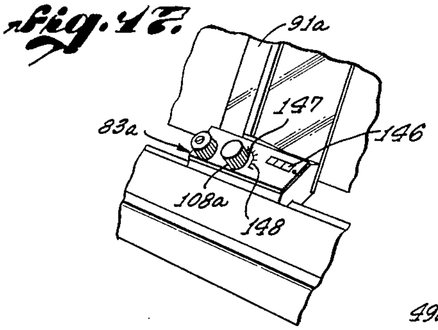
Fig. 18.
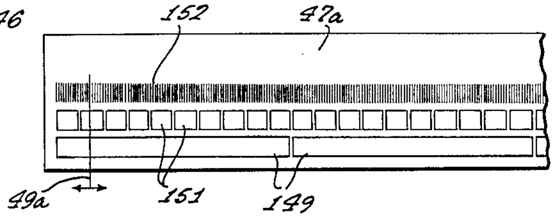
Fig. 19.
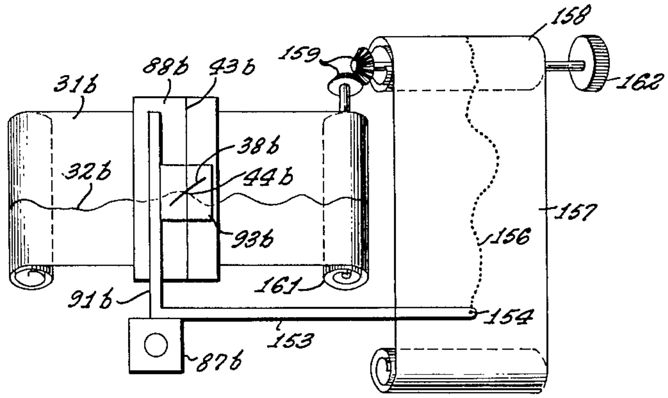
Fig. 21.
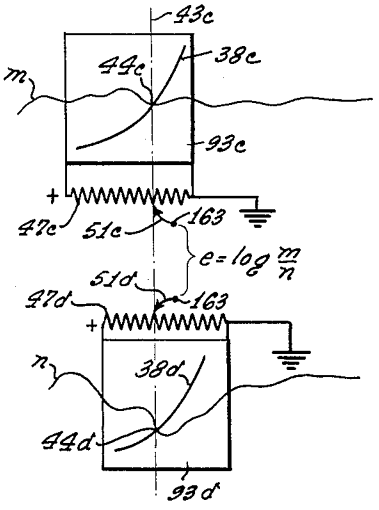
Fig. 20.
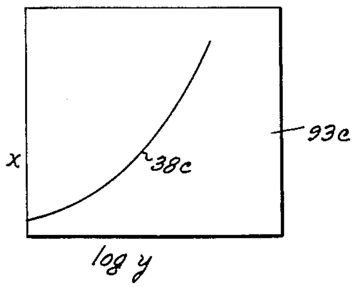
BERNARD S. BENSON,
INVENTOR.
HUEBNER, BEEHLER,
WORREL & HERZIG,
ATTORNEYS.
BY Warren T. Jessup BERNARD S. BENSON,
INVENTOR.
HUEBNER, BEEHLER,
WORREL & HERZIG,
ATTORNEYS.
BY Warren T. Jessup

GRAPH TRANSFORMATION APPARATUS

Filed April 24, 1953

BERNARD S. BENSON,
INVENTOR.

HUEBNER, BEEHLER,
WORREL & HERZIG,
ATTORNEYS.
BY Warren T. Jessup

United States Patent Office 2,999,315

Patented Sept. 12, 1961

2,999,315

GRAPH TRANSFORMATION APPARATUS

Bernard S. Benson, Malibu, Calif., assignor to Benson-Lehner Corporation, Los Angeles, Calif., a corporation of California Filed Apr. 24, 1953, Ser. No. 350,991
17 Claims. (Cl. 33—1)

This invention relates to graph transformation apparatus.

There are many scientific fields wherein it has been found useful to measure and plot one variable in terms of another variable. Sometimes this plotting is done by human agency, with a series of points being plotted on a sheet of paper and then connected by a smooth curve to present a data graph representing the relation between the two variables. Sometimes such plotting is done automatically by a machine.

In many instances it is desirable to replot or transform the graph from the original graph sheet to another graph sheet. At times, such transformation of the graph effects merely a duplication of the graph onto another supporting medium; but more often the transformation involves the interjection of a function of one or both of the variables, rather than the variable itself. Such a transformation function may be in the form of a calibration curve, a logarithmic curve, a combined calibration and logarithmic curve, or other function or combination of functions.

While the instant invention has wide applicability to any form of graph transformation apparatus, specific reference will now be made to an example in which the transformation function is a calibration curve. This will be done simply for ease of illustration, and other examples of transformation functions will be pointed out hereinafter.

It is an object of this invention to provide improved graph transformation apparatus wherein a data graph of a first variable against a second variable may be readily transposed into a graph wherein a function of the first variable is plotted against the second variable or a function of the second variable.

It is another object of this invention to provide graph transformation apparatus whereby data may be readily realized from which there may be recorded a function of one variable against the second variable, or against a function of the second variable. Such recording may be done by a replotting mechanism, or by a digital recording mechanism. Such latter digital information may be recorded in a number of ways, including a tabular output fed to a typewriter, or a coded output fed to a punch card.

Referring to a specific example wherein the transformation function is a calibration curve, let us assume a typical case wherein a measurable quantity, representing a dependent variable, has been measured by a suitable instrument and has been plotted against an independent variable, such as time. Many measuring instruments, while accurate in the sense that they will always repeat the same reading for a given stimulus, require the use of calibration curves, so that the scale reading of the instrument may be properly transformed into a true reading of the quantity being measured. If we are now given a graph plot of the instrument reading against time, and wish to replot true or corrected values of the dependent variable against time, it is necessary to correct each point on the graph in accordance with the calibration curve of the measuring instrument. The obvious rudimentary way to do this is to move along the graph and at each significant point where a replot is desired read the indicated value of the dependent variable, refer to the calibration curve for the true value and then replot the point at the true value, read from the calibration curve.

It is an object of this invention to provide an improved apparatus and method for replotting correct values of a data graph.

In accordance with these objects and with other objects which will become apparent hereinafter, several embodiments exemplifying application of the instant invention have been shown in the accompanying drawings wherein:

FIG. 17 is a fragmentary perspective view showing an alternative modification of a portion of the apparatus shown in FIG. 5.

FIG. 18 is a schematic illustration showing another alternative modification of the apparatus of FIG. 5.

FIG. 19 is a schematic illustration of still another modification of the apparatus of FIG. 5.

FIG. 20 is a graph useful in understanding the instant invention.

FIG. 21 illustrates schematically another embodiment of the instant invention.

Figure 1:
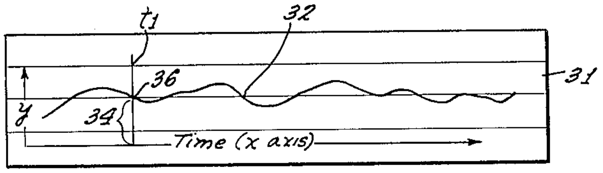
FIG. 1 is a diagram illustrating a data graph to be transformed in accordance with the instant invention.

FIGS. 24 through 28 inclusive are schematic diagrams illustrating a polar embodiment of the instant invention.

Referring to the drawings, there will first be described, for ease of understanding of the instant invention, a specific graph and specific apparatus, wherein a graph of a dependent variable, plotted on the Y coordinate of a Cartesian coordinate system, against time, plotted on the X coordinate of the system, is to be replotted in accordance with corrected or calibrated values of Y.

FIG. 1 shows a sheet 31 carrying a data graph or curve 32, wherein a measured quantity $y$ has been plotted on the Y axis of a Cartesian coordinate system, against time plotted on the X axis of the system. The present invention is applicable, generally, to a two-dimensional, visually perceptible representation, of which the graph 32 is illustrative. In accordance with the instant invention, means and methods are provided whereby the graph 32 may be replotted, or data be delivered, from which the graph 32 may be replotted as a corrected or calibrated graph 33 (FIG. 2), in which a function of $y$, $f(y)$, is to be plotted against time, instead of $y$ itself. In this case, the function of $y$ which is desired, in plaec of $y$ itself, is the corrected value of $y$ as taken from an instrument calibration curve 38 (FIG. 3).

Figures 3, 4:
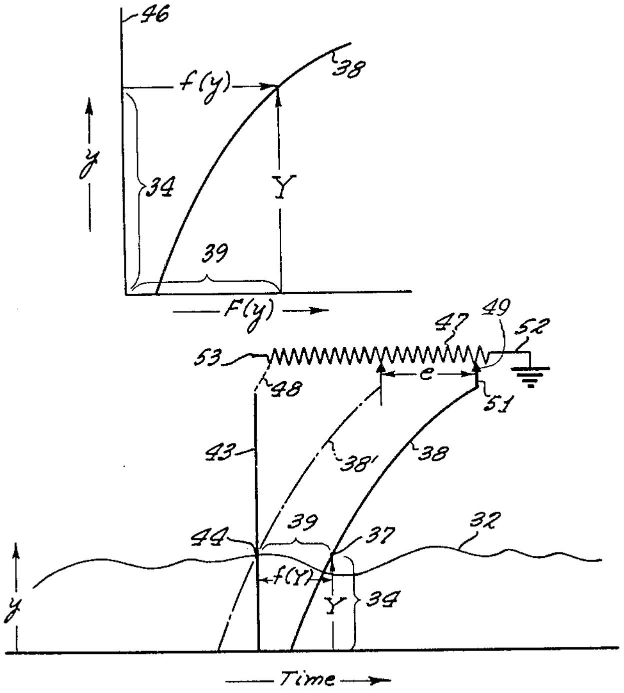
FIG. 3 illustrates a transformation graph employed in connection with the instant invention.
FIG. 4 is a schematic diagram illustrating the principles of the instant invention.

FIG. 3 represents a typical calibration curve 38 wherein the Y coordinate represents the value, $y$, actually indicated by the measuring instrument, and the X coordinate represents $f(y)$, the true or correct value of the measured quantity.

Thus, let us suppose that it is desired to know the true or corrected value of the graph 32 at the time $t1$. In FIG. 1 the indicated value is represented by the Y reading 34, shown to the point 36. In principle, one carries the Y reading 34 from the graph 32 to the calibration curve 38 (FIG. 3), and finds that this reading corresponds to the point 37 on the calibration graph or curve 38. The corrected value, $f(Y)$, at this point is then found to be the abscissa of the point 37, shown at 39 in FIG. 3. This corrected value 39 may now be plotted as the point 41 on the transformed graph sheet 42, shown in FIG. 2.

In accordance with the instant invention, a means and method for expeditiously and quickly deriving this revaluation of each point on the graph or curve 32 into its corrected value, to produce the graph 33, is provided.

Figure 2:
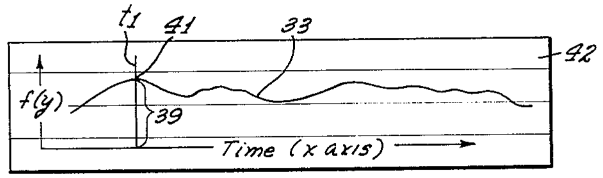
FIG. 2 illustrates a graph representing a transformed plot of the graph of FIG. 1.

Referring to FIG. 4, the graph or curve 32 is shown, which is to be operated on to produce a transformed or corrected graph 33 (FIG. 2). A first reference graph, in this case in the form of a straight reference line 43 paralleling the $y$ axis, is imposed or overlaid against the data graph 32. The reference graph 43 intersects the data graph 32 at the point 44, which is the point on the data graph 32 at or for which the transformed value of the graph 32 is desired to be known. A second reference graph, in this case a transformation graph in the form of the calibration graph or curve 38, is also imposed against the graphs 32 and 43 in such a position that the reference line 43 corresponds positionally to the $y$ axis ($x$ equals zero 46 of the calibration curve, as it is plotted in FIG. 3. In this attitude of the three graphs, 32, 43, and 38, it will be seen that the point 37 has the same ordinate 34 as does the point 44 under observation. It will also be seen that the horizontal distance (paralleling the $x$ or time axis) between the points 37 and 44 in FIG. 4 corresponds to the corrected value, $f$ (Y) which it is desired to derive, with the aid of the present invention. Therefore, if we move the calibration curve 38 to the left in FIG. 4, while leaving the two graphs 32 and 43 stationary, until the curve 38 intersects the point 44, as shown at 38', we have moved the curve 38 a horizontal ($x$ axis) distance corresponding and proportional to the desired value $f(Y)$.

Stated another way, let us position the data graph 38 in FIG. 4 horizontally so that it occupies the same position with respect to the reference line 43 as it did with respect to the $x$-equals-zero ordinate 46 in FIG. 3. This will be called the zero position of the curve 38. Let us now move the curve 38 horizontally to the left in FIG. 4 until it intersects the intersection 44 of the graph 32 and the reference line 43, as shown at 38' in FIG. 4. We have thus displaced the curve 38, from its zero position, a distance shown by the numeral 39; this distance 39 is directly proportional to the corrected value of the graph 32 at the point 44, namely, $f(Y)$.

By marking or otherwise disposing the graphs 43 and 38 on two physical members which are relatively movable with respect to each other along the $x$ axis, and by defining the zero position of the two members as that position wherein the two graphs 38 and 43 have the relative position of the lines 38 and 46 in FIG. 3, it will be readily seen that the position of one member with respect to the other, when graph 38 intersects point 44, is a unique function of the transformed or corrected curve value at the point 44.

The relative position between the members carrying the two graphs 43 and 38 may be measured by any suitable means. One such means has been shown schematically in FIG. 4, in the form of a potentiometer consisting of an impedance 47 linked by suitable linkage 48 to the member carrying the reference line 43, and a slider 49 linked by a suitable link 51 to the member carrying the transformation graph or correction curve 38. Thus the impedance 47 is positioned in accordance with the position of the line 43, while the slider 49 of the potentiometer which rides on the impedance 47 is positioned in accordance with the position of the correction curve 38. Hence, the relative position of the slider 49 on the impedance 47 is a unique function of the relative position between the graphs 38 and 43. Therefore, when the graph 38 is in the position shown at 38', the position of the slider 51 on the impedance 47 is a unique function of the transformed value of the curve 32 at the point 44, namely $f(Y)$.

By grounding one side of the potentiometer, as shown at 52 and applying a predetermined voltage, either alternating or direct, to the other terminal 53, it will readily be seen that the voltage appearing on the slider 49 will then be a direct measure of the transformed curve value, $f(Y)$.

Figures 5, 6:
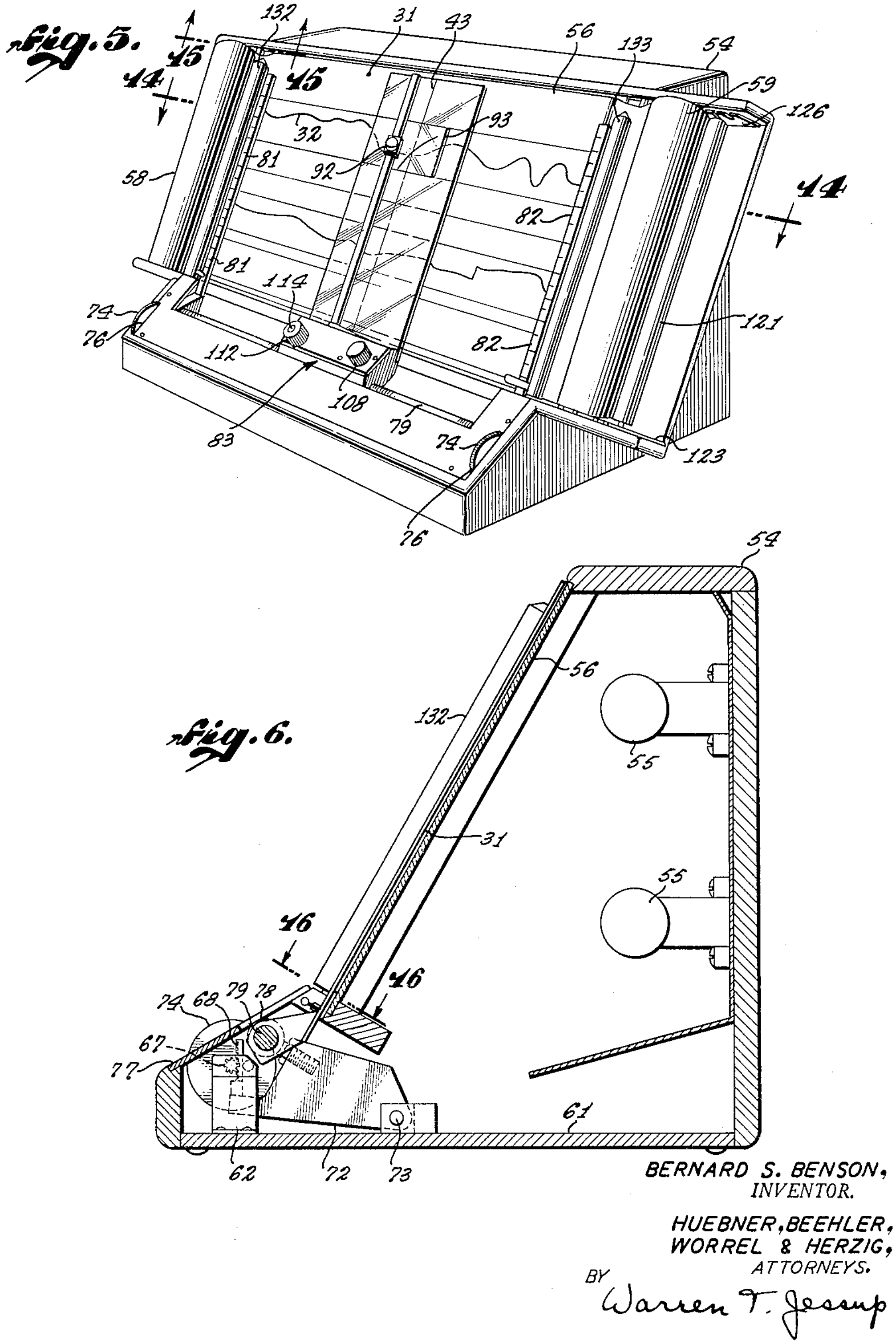
FIG. 5 is a perspective view illustrating a specific embodiment of an apparatus for practicing the instant invention.
FIG. 6 is a cross-sectional elevation of the apparatus shown in FIG. 5.

A specific example of a suitable apparatus for practicing the instant invention as thus described, will now be described:

Referring to FIG. 5, 54 designates a housing constituting data support means and including a sloping front panel 56 having a flat surface (FIG. 6) made of light transmitting material such as frosted glass. The front panel 56 is adapted to receive thereacross the spread out portion of a roll of paper or film 31, the two ends of which are rolled, as shown at 58 and 59 and contained at the respective sides of the panel 56. A pair of fluorescent tubes 55 provide a light source which renders visible, the data graph 32 marked on the sheet 31, through the translucence of the panel 56 and paper 31. Together, the panel 56 and the paper 31 constitute a data support for the representation of the observed data graph 32 marked on the paper 31. As set forth hereinbefore, the graph 32 represents the relation between two variables in a coordinate system. In this case, a Cartesian coordinate system is represented, and for the purposes of illustration it will be assumed that the $x$ axis of the graph 32 corresponds to time, while the $y$ axis corresponds to the measured and plotted value of an observed phenomenon.

The floor 61 of the housing 54 juts out forwardly from underneath the lower end of the panel 56, and to the forward portion of the floor 61, at each side thereof, are mounted upright trunnions 62. Extending between each trunnion 62 and the adjacent side wall 63 of the housing 54 is a short shaft 64, the ends of the shaft being journaled respectively in the wall 63 and trunnion 62. The trunnion 62 is offset outwardly, as shown at 66, and the shaft 64 passes through, and is journaled in, this outwardly extending offset portion. To the inner end of the shaft 64 is secured a pinion 67 which meshes with a gear rack 68 held against the pinion 67 by a roller 69 also journaled to the upper portion of the trunnion 62. The lower end of the gear rack 68 extends through a slot in the offset portion 66, and is pivotally secured at 71 to a shaft mounting member 72. The shaft mounting member 72 is in turn pivotally secured at 73 to the floor 61 of the housing 54. Fixed to the shaft 64 is a knurled wheel or disc 74 which extends through a slot 76 formed in a sloping shield 77 that covers the extended portion of the housing 54 below the graph-supporting panel 56.

From the structure thus described, it will be seen that on each side of the housing there is provided a shaft mounting member 72, the forward end of which may be moved up and down by rotation of the pinion 67 through the knurled wheel 74.

Figures 8, 9:
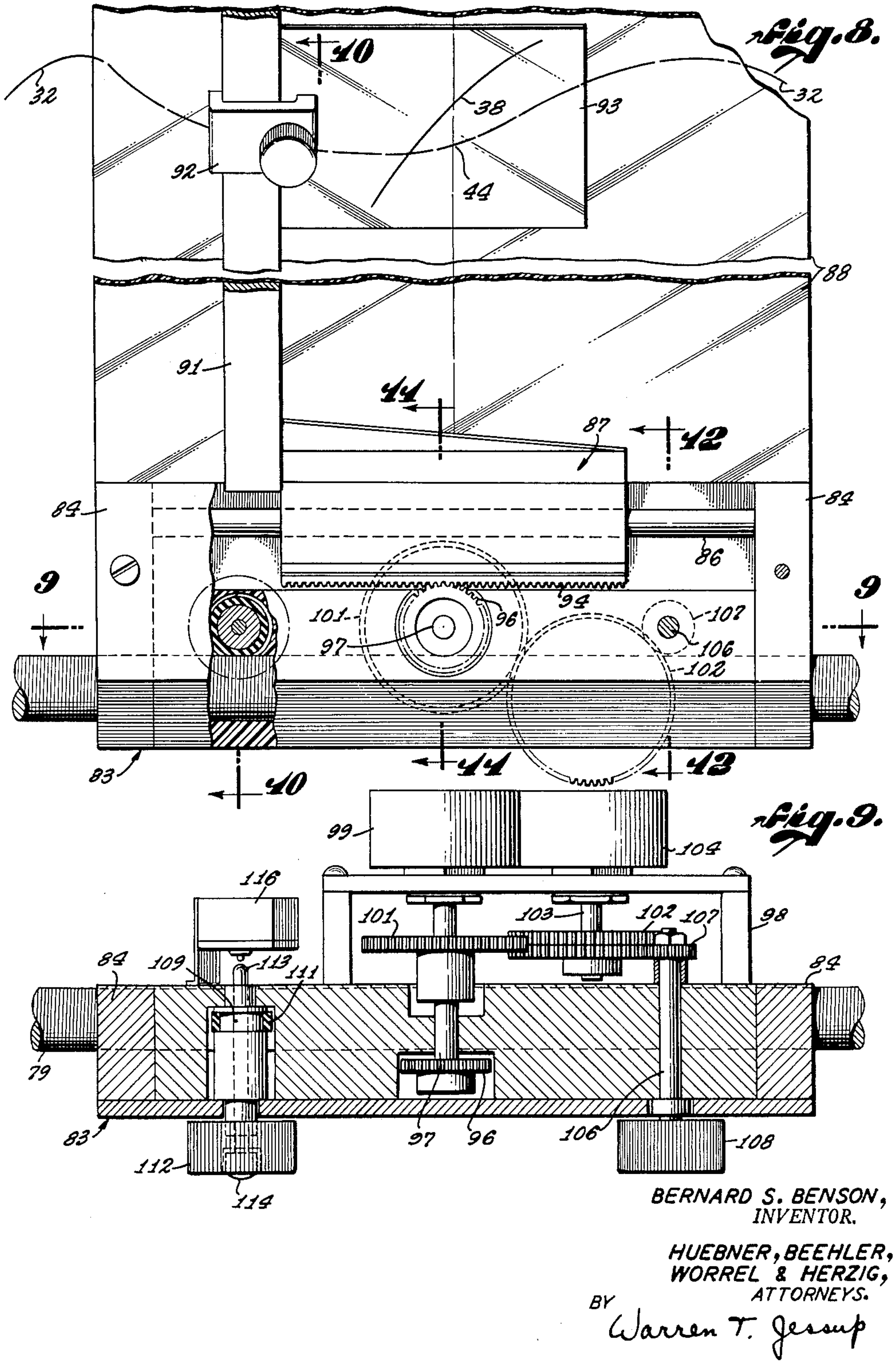
Fig. 8 is a fragmentary elevation showing a portion of the apparatus of FIG. 5.
FIG. 9 is a sectional plan taken on line 9—9 of FIG. 8.
Figures 10, 11, 12, 13:
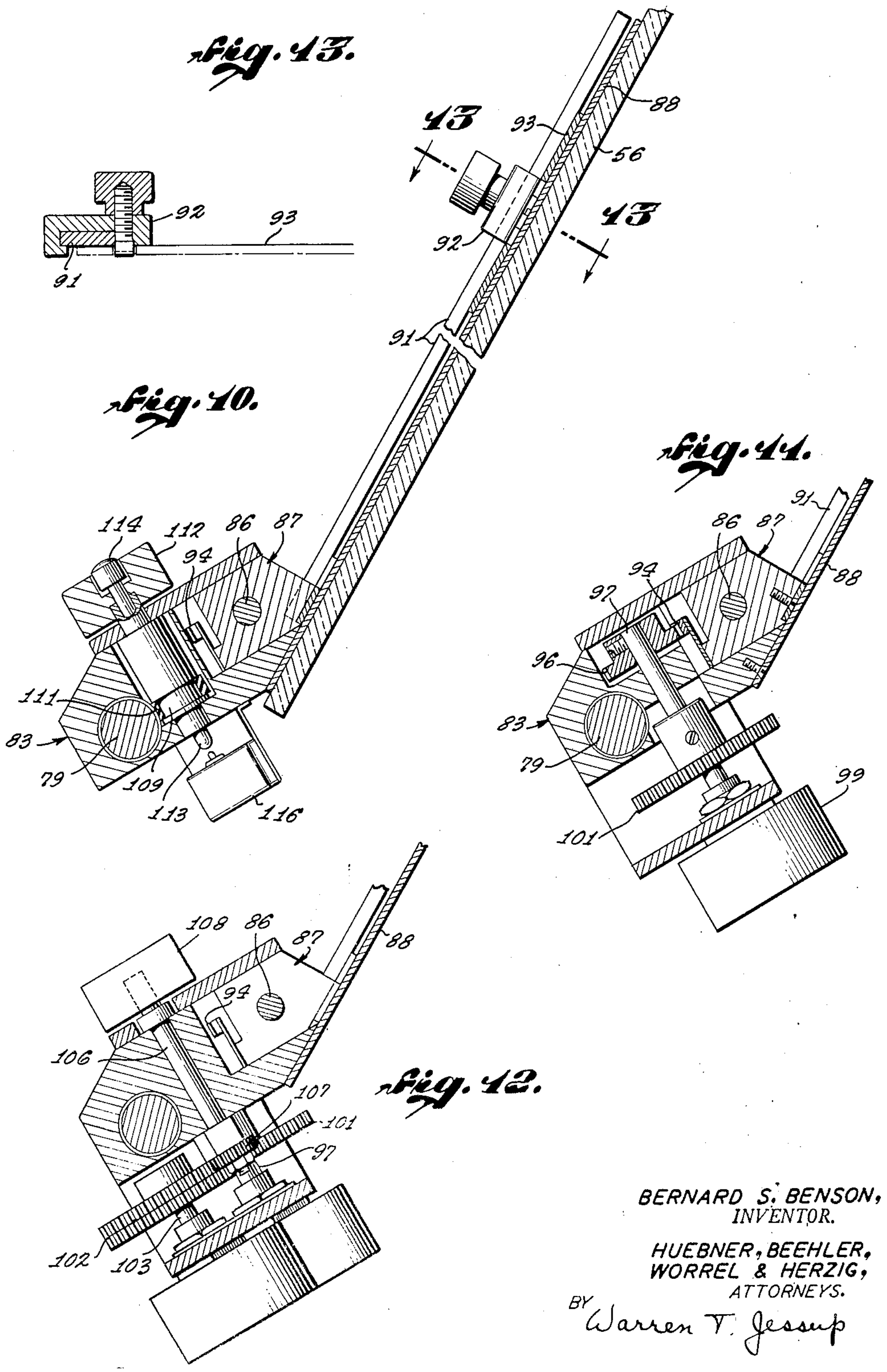
FIG. 10 is a fragmentary cross-section taken on line 10—10 of FIG. 8.
FIG. 11 is a fragmentary cross-section taken on line 11—11 of FIG. 8.
FIG. 12 is a fragmentary section taken on line 12—12 of FIG. 8.
FIG. 13 is a fragmentary cross-section taken on line 13—13 of FIG. 10.

Extending between the two shaft mounting members 72 and secured thereto by eyebolts 78, is an elongate guide means or member in the form of a first guide shaft 79. Mounted perpendicularly to the guide shaft 79 adjacent the ends thereof, are a pair of graduated guide bars 81 and 82 which extend over the face of the graph paper 31 imposed against the glass panel 56. Mounted for back and forth sliding motion on the guide shaft 79 is a first head member or reference member 83 (FIG. 8). Registering as it does with abscissae of the graph 32, the member 83 constitutes an abscissa readout member.

Since the head member 83 may also pivot around the shaft 79, there is provided an excellent means to tilt the member 83 about the shaft 79 to facilitate insertion of the graph paper 31, as will be explained more fully hereinafter. Extending between the end walls 84 of the reference member 83 and parallel to shaft 79, is a second guide shaft 86. Slidably mounted for back and forth movement on the shaft 86 is a second head member or reference member in the form of a transformation member 87. It will be seen that adjustment of the members 72 will cause the corresponding end of the shaft 79 to move toward or away from the graph 32.

The reference member 83 has a portion which includes a transparent reference plate 88 projecting upwardly therefrom and overlying the graph paper 31. Marked on the reference plate 88 is a reference graph in the form of a straight reference line 43 which extends upwardly over the plate 88 at right angles to the shaft 79, and transverse of the left to right direction of the data graph 32.

In the example shown, the transformation member 87 constitutes an ordinate member and includes an arm or bar 91 secured at the left side of the head portion 87 and extending upward parallel to the reference line 43. To the bar 91 is adjustably mounted, by means of clamp 92, an ordinate readout member in the form of a transparent transformation graph member or plate 93, on which is marked an ordinate readout in the form of a transformation graph or curve 38 adapted to overlie and be opposed against the reference line 43 and the data graph 32. The graph 38 constitutes an ordinate readout graph, as will become more fully apparent hereinafter.

Along the lower edge of the member 87 is a gear rack 94 which meshes with a pinion 96 secured to a shaft 97 journaled in the head member 83 (FIG. 9). A frame 98 extends from the back of the head member 83, and to the frame 98 is secured a potentiometer 99. The potentiometer 99 is of conventional circular configuration having an impedance mounted within the casing of the potentiometer and a slider operated across the impedance by the turning of the shaft 97. The impedance portion of the potentiometer 99 is represented by the numeral 47 of FIG. 4, while the slider portion operated by the shaft 97 is represented by the numeral 51 of FIG. 4. The potentiometer 99 constitutes a means for measuring the relative position of the transformation member 87 on the reference member 83.

The shaft 97 also carries a gear 101 which meshes with another gear 102 carried by a shaft 103 also journaled in the frame 98. The shaft 103 actuates a second impedance 104. Two impedances 99 and 104 are provided because it is often desirable to put out identical electrical outputs from a single setting of the transformation member 87.

Journaled in the head member 83 and extending outwardly to the front surface thereof is a shaft 106, the rear end of which carries a pinion 107 that meshes with the gear 102. As shown in FIG. 9, the gear 102 is of the split type composed of two identical sections having a torsion spring therebetween. This arrangement obviates backlash between the gears 102 and 101. The forwardly extending end of the shaft 106 carries an operating knob 108.

From the description thus far, it will be seen that turning of the knob 108 causes the transformation member 87 to move back and forth on the shaft 86, thus adjusting the position of the transformation graph 38 with respect to the reference line 43. The potentiometer 99 is connected to a source of voltage, as described hereinbefore in connection with FIG. 4, so that the output from the slider 51 actuated by the shaft 97 is a unique function of the position of the transformation graph 38 relative to the reference line 43.

The reference member 83 is caused to move back and forth on the shaft 79 by the provision of a shaft 109, journaled in the member 83 and carrying a rubber wheel or face 111 that bears against the shaft 79. Turning of the shaft 109 by an external knob 112 causes the member 83 to be positioned back and forth on the shaft 79. In order to augment the frictional engagement between the rubber face 111 and the shaft 79, the latter is roughened by having a very light thread turned therein.

Extending axially through the shaft 109 is a push-button pin 113, the outer end of which has a button 114 and the inner end of which engages a microswitch 116, to close a suitable indicating or recording circuit. The circuit thus closed causes the voltage readings, contained in the potentiometer 99 by positioning of the shaft 97, to be taken off; and recorded, re-plotted, or otherwise registered by any suitable apparatus.

Figure 14:
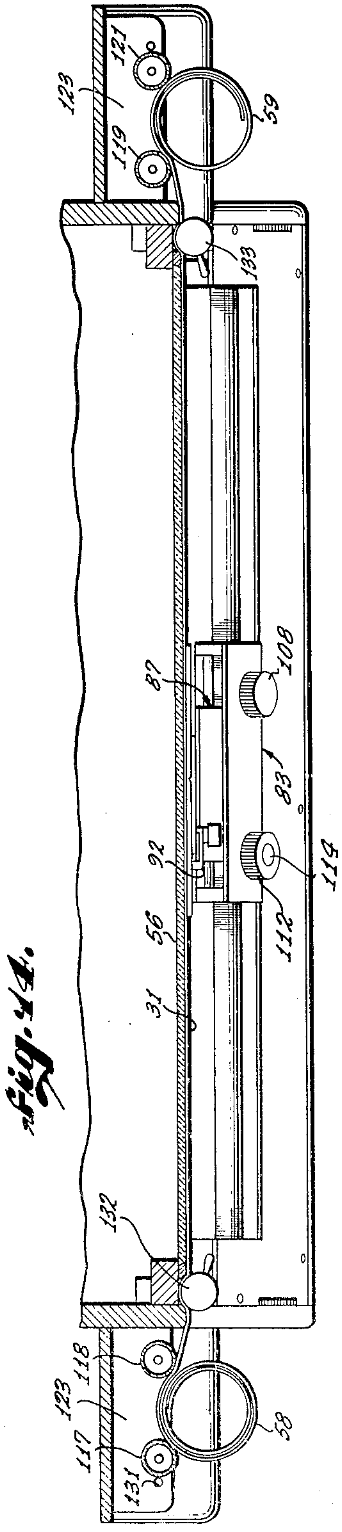
FIG. 14 is a sectional plan taken on line 14—14 of FIG. 5.
Figure 16:
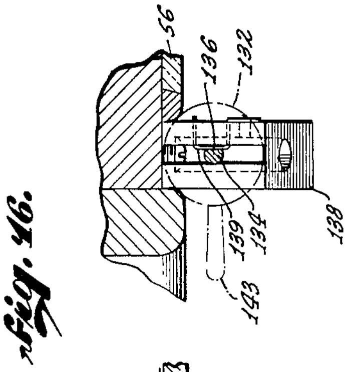
FIG. 16 is a fragmentary section taken on line 16—16 of FIG. 6.
Figure 15:
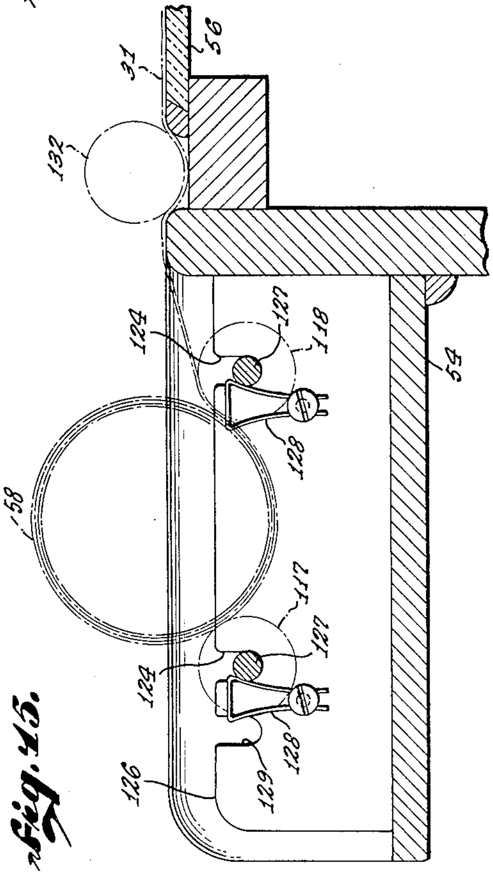
FIG. 15 is a fragmentary sectional view taken on line 15—15 of FIG. 5.

In accordance with the instant invention, means are provided for holding the graph paper 31 firmly against the transparent panel 56, while still permitting successive changes in the position of the paper, as it is wound on to the roll 58, and unwound from the roll 59. Such means are shown in FIGS. 14, 15 and 16; and include, among other things, two pairs of rollers 117, 118, 119, and 121, rotatably mounted at each side of the panel 56 and paralleling the two sides of the panel. As shown in FIG. 14, the rollers 117, 118 receive the left-hand roll 58 of the paper, while the rollers 119, 121 receive the right-hand roll 59.

Each of the rollers 117–121 is provided with a short stub shaft at each end. The lower stub shafts are journalled in mounting holes 122 (FIG. 7), formed in a supporting plate 123, mounted to the housing 54 at each side thereof. The upper stub shafts are positioned in slots 124 formed in the forward edge of an upper securing plate 126 (FIG. 15). These upper shafts 127 are held in the slots 124 by spring retaining arms 128, which are resiliently pushed to one side when the rollers 117, 118 are to be mounted or removed. In order to provide expansion of the roll of paper 58, an alternative slot 129 is provided in which the roller 117 may be mounted as the paper roll 58 gets larger. When the slot 129 is used, a corresponding lower mounting hole 131 (FIG. 7) is also used. The arrangement thus described at the left side of the housing 54 is substantially duplicated for the rollers 119, 121 at the right side of the housing.

For accurate use of the apparatus, it is necessary that the graph paper 31 be held flat against the transparent panel 56. To that end, in accordance with the instant invention, there is provided a pair of elongate cylindrical anchoring members in the form of round pressure bars 132, 133, one at each side of the panel 56. The pressure bar 132 will be described in detail, it being understood that the pressure bar 133 is substantially identical thereto.

Figure 7:
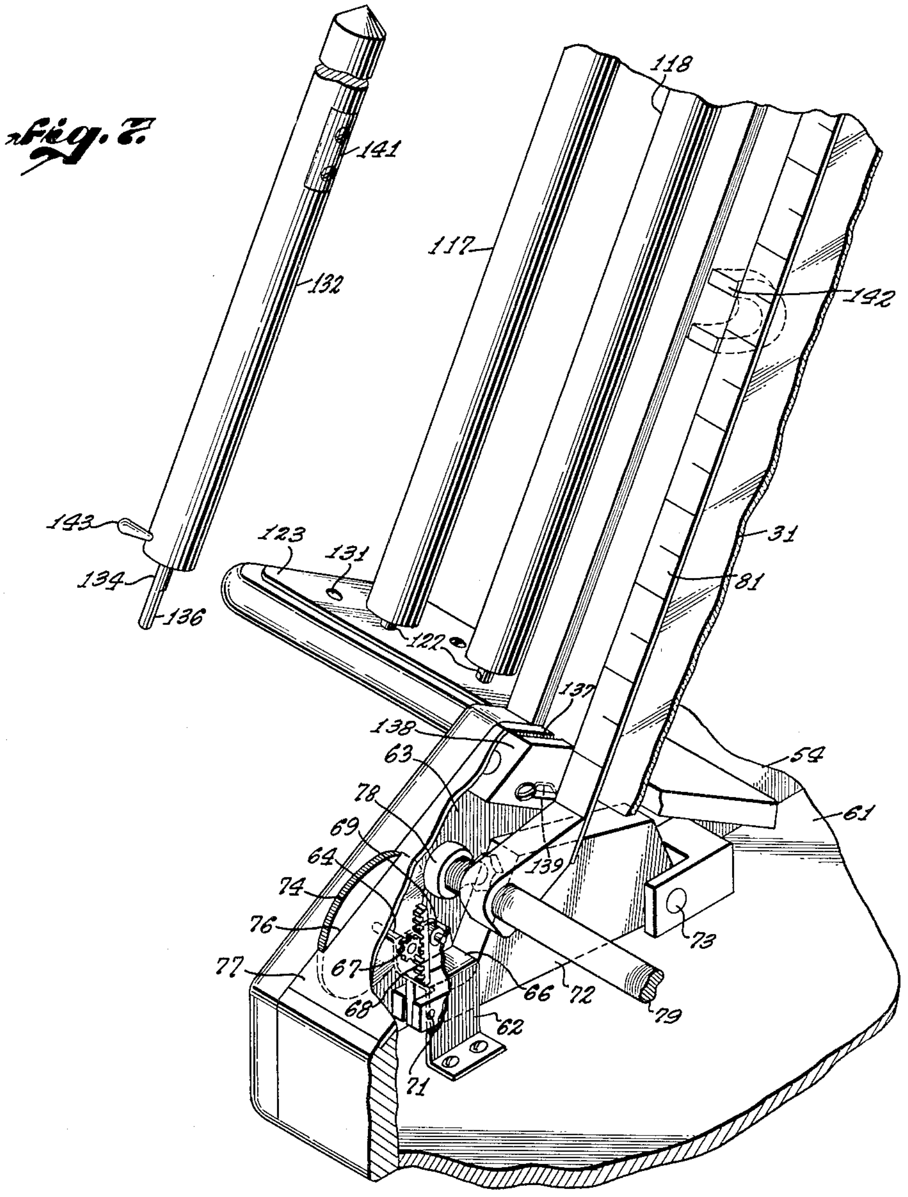
FIG. 7 is a fragmentary perspective view illustrating one corner of the apparatus shown in FIG. 5.

Referring particularly to FIGS. 7, 14 and 16, the pressure bar 132 is provided with a stub shaft 134 extended axially from the lower end of the bar and having a flat 136 thereon. The shaft 134 rides in a groove or slot 137 formed in a mounting block 138, disposed at the corner of the panel 56. The slot 137 permits the bar 132 to be rocked or pivoted about an axis transverse to the longitude of the bar, so as to allow the bar to be tilted away from the panel 56. Extending into the slot 137 from the side thereof is a resilient detent 139, which bears against the flat 136 and serves to resiliently hold the pressure bar 132 in the rotational position illustrated in FIGS. 7 and 16.

The pressure bar 132 is made of non-magnetic material, except for a ferromagnetic peripheral member or insert 141 recessed into the bar 132 about half way up from the bottom thereof. The surface of the insert 141 is substantially flush with the surface of the rest of the bar 132. The term "ferromagnetic" is used herein in its broad sense, that is, to define any material having a magnetic permeability materially greater than unity since any such materials will operate satisfactorily. The term is not intended to be limited to only those materials containing iron. At the height of the insert 141, so as to face the same, there is mounted in the case 54, at one side of the panel 56, a permanent, horseshoe magnet 142, the two poles of which face outwardly, as shown in FIG. 7. Near the bottom of the pressure bar 132 is a radially extending operating handle 143, by means of which the bar 132 may be turned within the slot 137.

When the bar 132 is in the position shown in FIG. 16, the magnetic insert 141 is out of registry with the magnet 142, so that the bar 132 may be readily tipped forwardly away from the paper 31, or even removed completely from the slot 137 if desired. When the pressure bar 132 is rotated by the handle 143, approximately 150° counterclockwise from the position shown in FIG. 16, the insert 141 is brought into registry with the poles of the magnet 142, causing the bar 132 to be pressed firmly against the left-hand edge of the exposed section of the paper 31. A corresponding action by the bar 133 causes the other side of the paper section 31 to be pressed against the panel 56; in this way the paper 31 is held flush against the panel 56 permitting accurate operation of the apparatus.

*Operation*

Operation of the specific embodiment illustrated in FIGS. 5 through 16 is substantially as follows:

With the lamps 55 energized, the operator turns the pressure bars 132 and 133 so that they are free from attraction by their respective magnets 132. The bars are then hinged forwardly from the top with the stub shafts 134 oscillating slightly in the slot or groove 137. The reference plate 88 is also tilted out of the way by being oscillated about its supporting shaft 79. The guide bars 81 and 82 are similarly tilted out of the way. Alternatively it has been found, in practice, that the paper may be merely slid in under the members 81, 82, 132, and 133.

The panel 56 is thus cleared for reception of a roll of graph paper or film 31 carrying a graph 32 to be transformed. When a desired section or panel of the paper 31 has been laid out against the panel 56, pressure bars 132 and 133 are moved back into position and rotated by the handles 143 until the magnet 142 acts upon the insert 141 to hold the bars firmly against the paper 31. This also retains the two rolled ends of the paper 58 and 59 in position against the two sides of the panel 56.

The guide bars 81 and 82 are then pivoted back into position against the paper 31; and the knurled wheels 74 are rotated to raise or lower the ends of the shaft 79 until the graduations on the bars 81 and 82 indicate that the shaft 79 is parallel with the $x$ axis of the graph paper 31, i.e. the abscissae of the data graph 32.

The reference plate 88 is tilted back into position, resting against the graph paper 31, carrying with it the transformation plate 93. By means of the knob 112, or otherwise, the head member 83 is moved until the reference line 43 on the plate 88 intersects a significant point on the data graph 32. The knob 108 is then rotated until the correction or transformation graph 38 intersects the intersection 44 of the reference line 43 with the data graph 32.

In accordance with the principles of the instant invention the output from the potentiometer 99 (and/or the potentiometer 104) is now directly proportional to the transformed value of the graph 32 at the point 44. The operator then presses the button 114 to close the microswitch 116, which closes a circuit connected between the potentiometer 99 and a suitable reading out apparatus. In this way the output of the potentiometer is read out, and recorded or replotted in any suitable manner.

The operator then moves the head member 83 horizontally until another desired significant point 44 is intersected by the reference line 43, and the operation is repeated.

*Alternative embodiments*

For some uses it has been found desirable to replace the guide bar 79 and rubber faced wheel 109 with a rack and pinion. In this way a unique correlation is established between the rotative position of the knob 112 and the position of the reference member 83 with respect to the data support. Hence by measuring the rotative position of the knob 112 by a potentiometer, or other suitable means, a measure may be obtained of the abscissa, or $x$ axis coordinate, of the graph point under consideration. Such a measurement is of value where the graph being transposed is not observed or read at equal $x$ axis intervals, but is read only at particular points along the $x$ axis. In this event the only way to obtain full information for the transformation of the graph is to measure the abscissa as well as the transformed ordinate of each observed point.

This measured value along the $x$ axis may be likewise stored and recorded by any suitable means, such as discussed herein.

It is also possible to use the relative position between the transformation member 87 and the reference member 83 as an incremental measure along the $x$ axis. To do this it is merely necessary to measure the displacement between the reference line 43 on the reference plate 88, and another vertical reference line placed on the transformation plate 93. In this case a direct measure of the incremental $x$ axis distance between two points on the graph 32 may be readily obtained. Thus readings may be alternatively taken, if desired, from the potentiometers 109 and 104, one reading being a corrected ordinate reading, and the other being an incremental abscissa reading.

As mentioned hereinbefore, any suitable means may be employed for measuring the relative position of the transformation graph 38 with respect to the reference graph or line 43; and by measuring there is meant to include sensing of all types, including indicating, recording, plotting, tabulating printing, typing, card punching, and/or storing of the sensed or measured data. Representative alternative ways of measuring the relative position between the graphs 38 and 43 are shown in FIGS. 17, 18, and 19.

In FIG. 17 there is shown, by way of example, the transformation-graph-carrying-bar 91*a* adjustable back and forth with respect to the reference or head member 83*a* by rotation of the knob 108*a*. Rotation of the knob 108*a*, however, instead of adjusting a potentiometer, as in the case of the embodiment of FIG. 5, just described, operates a counting mechanism 146 which, by recording the turns of the knob 108*a*, thus indicates the relative position of the bar 91*a* (and hence of the transformation plate 93*a*, not shown) with respect to the head member 83*a*. A pointer 147 on the knob 108*a* cooperating with indicia 148 on the surface of the head member 83*a* provides vernier measurements by enabling the counting of fractions of a revolution of the knob 108*a*.

In FIG. 18 there is shown an alternative embodiment in which the impedance member 47 of the potentiometer 99 of FIGS. 5–16 is replaced by a series of commutator bars mounted on an insulating member 47*a*, which may be either rectilinear or curved, depending upon the desired design. The commutator bars are constituted of a series of levels (shown as three). The first level comprises long bars 149, having associated and laterally aligned therewith ten bars 151, each of which is in turn associated with ten smaller and laterally aligned bars 152. The slider 49a simultaneously contacts one of the bars in each of the three levels, and thus produces, in decimal fashion, a unique reading which is a measure of the relative position of the slider 49a with respect to the base member 47a.

A further alternative means and method for measuring, (in this case directly plotting) the relative position between the reference graph 43 and the transformation graph 38 is shown in FIG. 19. Here the reference member 88b, carrying the reference line 43b, is stationarily mounted with respect to the housing 54 of the apparatus. Adjustment of the intersection point 44b between the graph 32b and the reference line 43b is obtained by moving the roll of graph paper 31b underneath the reference member 88b.

The transformation member 87b is mounted for horizontal movement back and forth with respect to the housing, and carries the upright bar 91b, to which is secured the transformation plate 93b, on which is marked the transformation graph 38b. Since the reference line 43b is fixed with respect to the housing, it follows that the position of the reference member 87b with respect to the housing now becomes the desired measure of the transformed value of the graph 32b at the point 44b. This relative position of the transformation member 87b with respect to the housing is measured by the provision of a horizontal bar 153 secured to the member 87b, which extends to one side of the housing panel, and which carries at its extended end a marking element 154, that may be selectively operated to produce a series of dots 156. These dots are produced on a re-plot sheet of graph paper 157 which is moved longitudinally in synchronism with the paper 31b, by being wound on a roll 158 synchronized by means of gears 159 with one of the rolls 161 on which the paper 31b is wound.

Operation of the alternative embodiment of FIG. 19 is essentially as follows: The paper 31b is positioned underneath the reference plate 88b until a desired intersection point 44b is obtained. The transformation member 87b is then moved horizontally until the transformation graph 38b also intersects the point 44b. The marking element 154 is then operated to place a dot 156 on the graph paper 157. The knob 162 is then turned to advance synchronously both the original graph paper 31b and the re-plot graph paper 157, until a new, significant intersection point 44b is obtained, for which the operation is repeated as above to obtain another graph point 156. The points 156 thus obtained may, if desired, be joined together in a smooth curve to give a transformed re-plot of the original curve 32b.

The apparatus of FIG. 19 may be readily adapted to continuous, rather than dot plotting of the graph 156. To achieve this it is only necessary to drive the rolls 158 and 161 continuously as by motor, and to cause the marking mechanism 154 to make a continuous trace on the replot paper or film 157. With such an apparatus, it is necessary for the operator to constantly follow the intersection 44b with the correction curve 38b. This may be readily done as long as the vertical excursions of the graph 32b are rather gentle.

The measured displacement between the transformation member 87 and the reference member 83 may be recorded in a large number of ways, as has been indicated hereinbefore. Included in these ways of recording are plotted outputs (exemplified by FIG. 19) and digital outputs. The latter type of output involves essentially the conversion of the spatial measurement, between the reference member and the transformation member, into a number. This number is stored, at least momentarily, in any suitable digital storage apparatus. From this digital storage apparatus it may be fed to one or more recording apparatuses. One such recording apparatus is a typewriter, the stored digital information being fed to the typewriter to cause it to automatically type out the digitally stored number, thus producing a tabular output. Such an apparatus for feeding a stored number to a typewriter is shown in pending application, Serial No. 281,-882, filed April 11, 1952, Bernard S. Benson et al. Another recording that may be made of the stored digital number is to feed it to a punch card system which records the number by unique spatial perforation of a card.

In the embodiments of the instant invention described thus far, the data support for the data graph has taken the form of an illuminated background against which is placed a roll of paper or film having marked thereon the data graph which is to be transformed. It will be readily appreciated that the instant invention is equally applicable to apparatus wherein the data graph 32, instead of being represented by a scribed line on a piece of paper or film, is projected optically onto a screen. In such case the reference members or plates 88 and 93 would overlie, or be imposed against, the screen carrying the image of the graph 32, rather than against the scribed graphs themselves.

In similar manner the reference graphs 43 and 38 may also be optically projected onto a common background with the data graph 32. In this case it would be the spatial relation among the members or elements that control the image projection of the various graphs which would form the basis for the measurement that determines the transformed values of the data graph.

The principles of the instant invention are readily adaptable to a combination of two curves. For example, referring to FIG. 21, suppose we have a graph which is the representation of a quantity $m$ plotted against time, and a second graph of a quantity $n$ also plotted against time. Suppose further, that the graph actually needed is a continuous plot, against time, of the instantaneous value of $m$ divided by $n$, i.e., $m/n$.

As shown in FIG. 20, there is first produced on a transparent plate 93c a logarithmic curve 38c, i.e., a curve in which the abscissa $x$ is equal to the logarithm of the ordinate $y$.

As shown in FIG. 21, this curve 38c is overlaid against the graph $m$. An identical logarithmic curve 38d is overlaid against the graph $n$, which is disposed beneath the graph $m$ with its abscissa parallel to the $m$ abscissa. The transformation member 93c carrying the graph 38c is linked to a potentiometer 47c, while the transformation member 93d is linked to the potentiometer 47d. The slider 51c, which operates on the element 47c, the slider 51d which operates on the element 47d, and the reference line 43c, which overlies both the graph $m$ and the graph $n$, are all linked together to be movable simultaneously.

When related intersection points 44c and 44d have been effected by appropriate positioning of the members 93c and 93d, it follows that the voltage appearing at the slider 51c is proportional to $f(m)$, which in this case is log $m$. The voltage appearing at the slider 51d is proportional to $f(n)$, which in this case is log $n$. Hence, the voltage appearing between the terminals 163, which are connected respectively to the sliders 51c and 51d, is proportional to the difference, i.e., to log $m$ minus log $n$. Log $m$ minus log $n$ is in turn equal to log $m/n$. Thus the output voltage appearing at the terminals 163 is proportional to log $m/n$, and by applying this voltage to a suitably scaled instrument a direct reading of $m/n$ may be obtained.

In operation of the apparatus shown in FIG. 21, the operator first positions the graphs $m$ and $n$ so that corresponding times are vertically aligned. He then moves the reference member carrying the reference line 43c until desired points of intersection 44c and 44d are obtained. The transformation member 93c is then moved horizontally until the graph 38c intersects the intersection 44c. This positions the slider 51c with respect to the potentiometer 47c and determines the voltage on the upper of the two terminals 163. The transformation member 93*d* is then moved horizontally until the graph 38*d* intersects the intersection 44*d*. This positions the slider 51*d* with respect to the potentiometer 47*d* and determines the voltage on the lower of the two terminals 163. The difference voltage appearing between the terminals 163 is then equal to log $m/n$, as explained hereinbefore.

Figure 22:
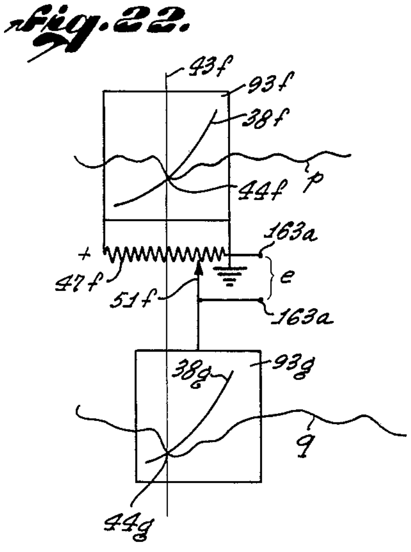
FIG. 22 illustrates schematically still another embodiment of the instant invention.

The results achieved by the apparatus of FIG. 21 can also be obtained by use of a single potentiometer, as shown in FIG. 22. In this case the elements overlying the upper graph $p$ are substantially the same as those overlying the graph $m$ of FIG. 21 and bear corresponding reference numerals followed by the postscript $f$ instead of the postscript $c$, as in FIG. 21. The slider 51*f*, however, instead of being linked to the reference line 43*f* is linked to the transformation plate 93*g* which overlies the lower graph $q$. In the apparatus shown in FIG. 22, the reference line 43*f* is not linked to any measuring member, but is used simply to assure that the intersection points 44*f* and 44*g* are aligned vertically.

With the apparatus of FIG. 22, the position of the transformation member 93*f*, which carries the potentiometer 47*f*, is proportional to log $p$. The position of the number 93*g*, which carries the slider 51*f*, is proportional to log $q$. Therefore, the difference in position between the potentiometer 47*f* and its slider 51*f*, which is measured by the voltage appearing across the terminals 163*a*, is proportional to log $p$ minus log $q$, which in turn is equal to log $p/q$.

Figure 23:
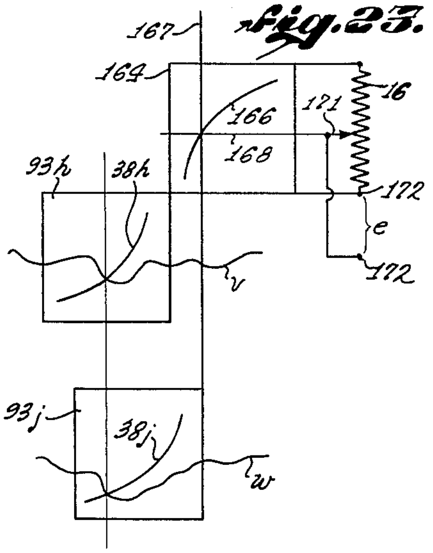
FIG. 23 illustrates schematically still another embodiment of the instant invention.

Both the apparatus shown in FIG. 21 and that shown in FIG. 22 produce a voltage which is proportional to the logarithm of the desired quotient. The necessity for a specially calibrated meter is obviated by the apparatus of FIG. 23, in which the output voltage is directly proportional to the desired quantity, in this case $v/w$. In the FIG. 23 embodiment the transformation member 93*h*, carrying the log graph 38*h* overlying the graph $v$, is connected or linked to another plate 164 on which is marked an anti-log graph 166. The transformation plate 93*j*, overlying the other graph $w$, is connected or linked to a reference line 167 which is movable transversely across the face of the plate 164. As in the case of the apparatus of FIG. 22, the horizontal position of the plate 93*j* (and line 167) with respect to the horizontal position of the plate 93*h* (and the plate 164) is directly proportional to the log of $v/w$. If, now, a horizontal reference line 168 is provided which is movable vertically across the plate 164, and if that line 168 is positioned vertically until it intersects the intersection of the line 167 and the anti-log curve 166, the vertical position of the line 168 with respect to the plate 164 will be directly proportional to $v/w$ instead of log $v/w$.

A potentiometer 169 is linked to the plate 164, and the slider 171 of the potentiometer is linked to the horizontal reference line 168. Thus the output voltage appearing at the terminals 172 is directly proportional to $v/w$.

It will be readily appreciated that, if desired, a correction or calibration factor may be introduced into the curves 38*c*, 38*d*, 38*f*, 38*g*, 38*h*, and/or 38*j*, along with the logarithmic function mentioned hereinbefore. In this way the desired quotient is obtained with the correction or calibration automatically included therein.

The instant invention has been described thus far with reference to data graphs plotted on Cartesian coordinate systems. The principles are equally applicable to other systems, such as a polar system as will now be described.

Figure 24:
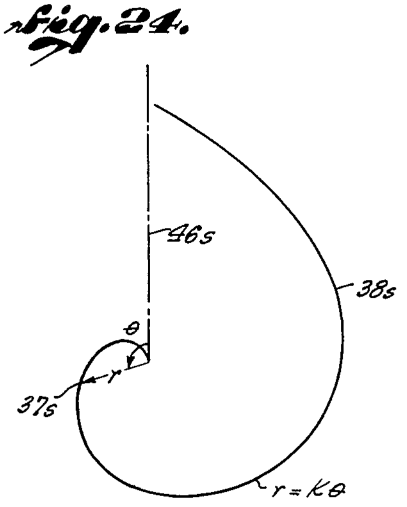

In FIG. 24 there is illustrated a polar graph in which the radial position or distance $r$ of any point on the graph is directly proportional to the angle of displacement $\theta$ of the point 37*s* from a given radial reference line 46*s*.

Figure 25:
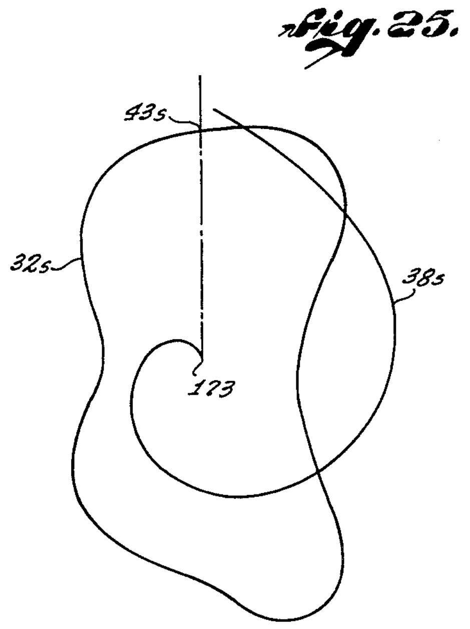

Referring to FIG. 25, let it be supposed that we have a given polar data graph 32*s* which it is desired to transform in accordance with the principles of the instant invention. A transparent member carrying a radial reference line 43*s* overlies the data graph 32*s* and is pivotally mounted with respect thereto for rotation about the zero point 173. Another transparent reference number carrying the transformation graph 38*s* overlies the two graphs 32*s* and 43*s* and is also pivotally mounted for independent rotation about the point 173.

Figure 26:
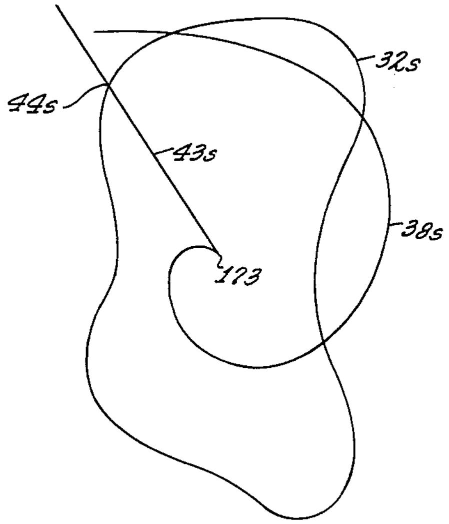
Figure 28:
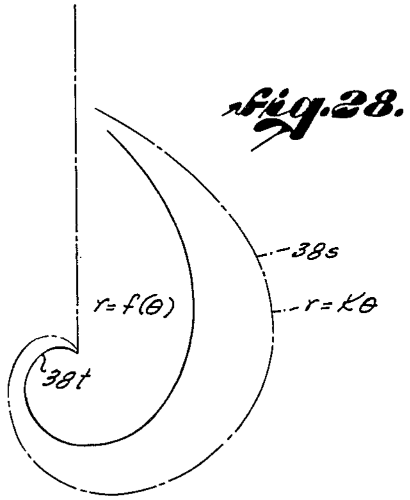

In operation, the members carrying the two graphs 43*s* and 38*s* are temporarily locked together and rotated together about the point 173 until the reference line 43*s* intersects the graph 32*s* at a desired point 44*s*, which is to be transformed in accordance with the instant invention, as shown in FIG. 26.

Figure 27:
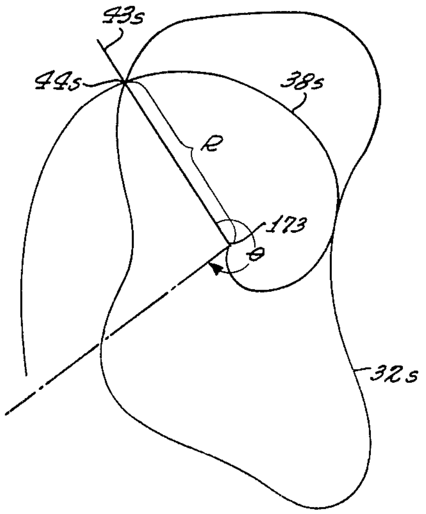

With the reference line 43*s* held stationary with respect to the graph 32*s*, the transformation graph 38*s* is now rotated clockwise to the position shown in FIG. 27, so that it intersects the intersection point 44*s* between the graph 32*s* and the reference line 43*s*.

By virtue of the nature of the curve 38*s*, as explained in connection with FIG. 24, it will be seen that the angle $\theta$ in FIG. 27 through which the curve 38*s* was rotated to achieve this relationship is directly proportional to the radius R in FIG. 27, which is the distance of the point 44*s* from the center point 173 of the system. It is thus seen that the angle $\theta$ achieved through these steps is a direct measure of the radial value R of the point 44*s* under observation.

The transformation achieved with such a curve 38*s* shown in FIG. 24 would produce simply a faithful reproduction of the original curve 32*s*, since no alteration or correction has been introduced in this illustrative example. The curve 38*s* thus corresponds in polar coordinates to a straight line 38, in the Cartesian coordinates system illustrated in FIG. 3. To introduce a correction it is merely necessary to create a curve 38*t* (FIG. 28) which deviates from the non-corrective curve 38*s* by the amount of the desired correction or transformation. Thus when the curve 38*t* is substituted for the curve 38*s* in the example illustrated in FIGS. 24–27, the transformed values for the new curve 32 will be representative of $f(r)$ plotted against $\theta$, rather than $r$ plotted against $\theta$.

While the instant invention has been shown and described herein in what is conceived to be the most practical and preferred embodiments, it is recognized that departures may be made therefrom within the scope of the invention, which is therefore not to be limited to the details disclosed herein but is to be accorded the full scope of the claims.

What is claimed is:

1. Graph transformation apparatus comprising a housing having a sloping light transmitting front panel; light means within the housing; a pair of rollers rotatably mounted at each side of the panel paralleling the two sides of the panel, said rollers being adapted to receive on the surface thereof a roll of sheet material bearing a graph thereon; a pair of round pressure bars mounted parallel to each side of said panel between the sides of the panel and said rollers; said housing including a pair of mounting members each having an outwardly extending groove, each of said pressure bars having a downwardly extended shaft adapted to be disposed, respectively, in said grooves; a pair of magnets mounted, one at each side of the front panel; each of said pressure bars being of non-magnetic material, except for an insert of magnetic material positioned vertically to register with the corresponding magnet, and extending only partially around the periphery of said bar; an operating handle extending radially from each bar for rotating said bar, thereby to rotate said magnetic insert away from the magnet, whereby said bar may be readily separated from said magnet; said pressure bars being adapted to press said sheet material firmly against said panel at each side of said panel; a first guide shaft disposed horizontally at the lower edge of said panel; means mounting said first guide shaft at each end for up and down movement; a pair of graduated guide bars secured to said first guide shaft near each end and extending upwardly therefrom over the face of said panel at each side thereof; a first head member mounted on said first guide shaft and slidable back and forth therealong; a second guide shaft secured to said first head member and paralleling said first guide shaft; a second head member mounted on said second guide shaft and slidable back and forth therealong; said second head member having a gear rack thereon; a pinion rotatably mounted on said first head member and engaging said rack; a first knob rotatably mounted on said first head member and connected to said pinion to rotate the same; a potentiometer including a circular impedance and a slider movable therearound, said slider being connected to said first knob to be rotated thereby; a drive shaft having a friction drive wheel thereon engaging said first guide shaft, said drive shaft having a drive knob on one end thereof adapted to be turned to move said first head member along said first guide shaft; push button means extending axially through said drive shaft and reciprocably mounted therein; switch means mounted beneath said push button means to be operated by actuation thereof; a transparent reference plate mounted on said first head member and overlying said panel; said reference plate having a straight line marked thereon paralleling said graduated bars; said second head member having a transformation bar extending upwardly therefrom and overlying said reference plate; a transparent transformation plate having a transformation graph thereon; and means for adjustably securing said transformation plate to said transformation bar.

2. Graph transformation apparatus comprising a substantially flat data support adapted to have imposed thereon a sheet carrying a data graph, a pair of shaft mounting members pivotally mounted with respect to said data support one at each side thereof, a pair of gear racks pivotally secured, respectively, to said shaft mounting members, a pair of pinions pivotally mounted with respect to said data support and engaging, respectively, said racks, a pair of manually engageable adjusting wheels for positioning said pinions thereby to position said shaft mounting members, a first guide shaft having its ends mounted, respectively, on said shaft mounting members, said shaft extending between said shaft mounting members, a pair of guide bars mounted on said first guide shaft adjacent the ends thereof and extending over the face of said data support, a first head member mounted on said first guide shaft and slidable therealong, a second guide shaft mounted on said first head member paralleling said first drive shaft, a second head member mounted on said second guide shaft and slidable therealong, a transparent reference plate mounted on said first head member and overlying said data support, said reference plate having a straight line thereon substantially at right angles to said first guide shaft, a transformation member including a transparent plate, said transformation member being mounted on said second head member, said transformation plate having a transformation graph thereon, and means for measuring the position of said second head member on said first head member.

3. Apparatus according to claim 2, wherein said measuring means comprises a potentiometer including a circular impedance and a slider rotatable thereover, said impedance being mounted on said first head member, said slider being mounted on a first shaft, said second head member including a gear rack, a pinion engaging said gear rack, a second shaft rotatably mounted on said first head member and connected to said pinion to position the same, said second shaft and said first shaft being linked together, and knob means on said first head member for positioning said first shaft and said second shaft.

4. Graph transformation apparatus comprising a stationary data support having a flat surface adapted to have imposed thereon a data graph, said data graph extending generally from left to right when viewed by a human operator seated at the support, an elongate guide member mounted on said support and disposed substantially horizontal and parallel to the direction of the data graph, a reference member mounted on said guide member and movable longitudinally back and forth therealong, a portion of said reference member projecting over said flat surface and carrying a reference line generally transverse of the left to right direction of said data graph, said reference line being imposable against said data graph, a transformation member movably mounted on said reference member for back and forth movement parallel to said guide member, said transformation member including an arm extending substantially parallel to said reference line, a transformation graph member secured to said arm and carrying thereon a transformation graph adapted to be imposed against said reference graph and said data graph, and means for measuring the relative position of said transformation member on said reference member.

5. Graph transformation apparatus comprising a stationary data support having a flat surface adapted to have imposed thereon a data graph, said data graph extending generally from left to right when viewed by a human operator seated at the support, elongate guide means mounted on said support and disposed substantially horizontal and parallel to the direction of the data graph, means for mounting at least one end of said elongate guide means for movement toward and away from the data graph imposed on said surface, an indexed guide member secured to said movable end of said elongate guide means and disposable along an edge of said data support, whereby said elongate guide means may be adjusted into accurate parallelism with the abscissae of said data graph, a reference member mounted on said guide means and movable longitudinally back and forth therealong, a portion of said reference member projecting over said flat surface and carrying a reference line imposable against said data graph, a transformation member movably mounted on said reference member and carrying a transformation graph member having a transformation graph thereon adapted to be imposed against said reference graph and said data graph, and means for measuring the relative position of said transformation member on said reference member.

6. Graph transformation apparatus comprising a stationary data support having a flat surface adapted to have imposed thereon a data graph, said data graph extending generally from left to right when viewed by a human operator seated at the support; elongate guide means mounted on said support and disposed substantially horizontal and parallel to the abscissae of the data graph; means for mounting at least one end of said elongate guide means for movement toward and away from the data graph imposed on said surface, said movement being generally along the ordinate of the data graph; an index guide member secured to said movable end of said elongate guide means and disposable along an edge of said data support, whereby said elongate guide means may be adjusted in accurate parallelism with the abscissae of the data graph; an abscissa read-out member mounted on said guide means and movable longitudinally back and forth therealong, a portion of said abscissa read-out member projecting over said flat surface and carrying a reference line generally transverse of the abscissae of the data graph, said reference line being imposable against the data graph; an ordinate read-out member movably mounted on said reference member and carrying an ordinate read-out graph adapted to be imposed against said reference line and said data graph, and means for measuring the relative position of said ordinate read-out member on said abscissa read-out member.

7. Graph transformation apparatus comprising a stationary support having a flat surface adapted to have imposed thereon a data graph, said data graph extending generally from left to right when viewed by a human operator seated at the support; elongate guide means mounted on said support and disposed substantially horizontal and parallel to the direction of the data graph; a reference member mounted on said guide means and movable longitudinally back and forth therealong, a first knob on said reference member manually rotatable by the operator, means for moving said reference member back and forth along said guide means in response to a rotation of said first knob, said reference member having a portion projecting over said flat surface and carrying a reference line generally transverse of a left to right direction of said data graph, said reference line being registrable against said data graph, a transformtion member movably mounted on said reference member and having a transformation graph member carrying a transformation graph adapted to be registered against said reference graph and said data graph, a second knob on said reference member manually rotatable by the operator, means for moving said transformation member with respect to said reference member in response to rotation of said second knob, and means for measuring the relative position of said transformation member on said reference member.

8. Apparatus comprising a substantially flat support adapted to have imposed thereon a sheet carrying a two-dimensional representation, a pair of elongate cylindrical anchoring members, one at each side of said support, each of said members having therein a ferro-magnetic member, said data support having corresponding ferro-magnetic members facing said first mentioned ferro-magnetic members, at least one of each facing pair of said ferro-magnetic members being permanently magnetized to hold the elongate members firmly against the support, each of said members having a handle for rotating the member, thereby to break the magnetic seal and permit easier separation of said members from said support.

9. Coordinate read-out apparatus comprising a stationary data support having a flat surface adapted to have imposed thereon a two-dimensional, visually perceptible representation viewable by a human operator seated at the support, a reference member projecting over said flat surface mounted for movement back and forth along the abscissa of said representation, and carrying a reference line registrable against said representation, a first knob on said reference member manually rotatable by the operator, means for moving said reference member back and forth over said flat surface in response to rotation of said first knob, an ordinate read-out member movably mounted on said reference member for reading out ordinates on said representation and having an abscissa component of movement with respect to said reference member, said ordinate read-out member carrying a read-out graph adapted to be registered against said representation and said reference line, a second knob on said reference member manually rotatable by the operator, means for moving said ordinate read-out member with respect to said reference member in response to rotation of said second knob, and means for measuring the position of said ordinate read-out member on said reference member, thereby to read out ordinates from said representation.

10. Graph transformation apparatus comprising a stationary data support having a flat surface adapted to have imposed thereon a data graph, the abscissae of said data graph extending generally from left to right when viewed by a human operator seated at the support, an elongate guide member mounted on said support and disposed substantially horizontal and parallel to the direction of the data graph, means for mounting at least one end of said elongate guide member for movement toward and away from the data graph imposed on said surface, an indexed guide member secured to said movable end of said elongate guide member and disposed along an edge of said data support, whereby said elongate guide member may be adjusted in accurate parallelism with the abscissae of said data graph, a reference member mounted on said guide member and movable longitudinally back and forth therealong, a portion of said reference member projecting over said flat surface and carrying a reference line generally transverse of the left to right direction of said data graph, said reference line being impossible against said data graph, a transformation member movably mounted on said reference member for back and forth movement parallel to said guide member, said transformation member including an arm extending substantially parallel to said reference line, a transformation graph member secured to said arm and carrying thereon a transformation graph adapted to be imposed against said reference graph and said data graph, and means for measuring the relative position of said transformation member on said reference member.

11. Graph transformation apparatus comprising a stationary data support having a flat surface adapted to have imposed thereon a data graph, said data graph extending generally from left to right when viewed by a human operator seated at the support, an elongate guide member mounted on said support and disposed substantially horizontal and parallel to the direction of the data graph, a reference member mounted on said guide member and movable longitudinally back and forth therealong, a portion of said reference member projecting over said flat surface and carrying a reference line generally transverse of the left to right direction of said data graph, said reference line being imposable against said data graph, a transformation member movably mounted on said reference member for back and forth movement parallel to said guide member, said transformation member including an arm extending substantially parallel to said reference line, a transformation graph member secured to said arm and carrying thereon a transformation graph adapted to be imposed against said reference graph and said data graph, and means for measuring the relative position of said transformation member on said reference member, and comprising a potentiometer mounted on said reference member, said potentiometer having a slider, and means for positioning said slider in accordance with the position of said transformation member on said reference member, whereby the electrical output of said potentiometer is a direct function of the position of said transformation member on said reference member.

12. Graph transformation apparatus comprising a stationary data support having a flat surface adapted to have imposed thereon a data graph, said data graph extending generally from left to right when viewed by a human operator seated at the support, an elongate guide member mounted on said support and disposed substantially horizontal and parallel to the direction of the data graph, a reference member pivotally mounted about said guide member and movable longitudinally back and forth therealong, a portion of said reference member projecting over said flat surface and carrying a reference line generally transverse of the left to right direction of said data graph, said reference line being imposable against said data graph, the pivotal mounting of said reference member permitting said reference line carrying portion to be tilted away from said flat surface to permit ready insertion of a sheet carrying said data graph between said flat surface and said portion, a transformation member movably mounted on said reference member for back and forth movement parallel to said guide member, said transformation member including an arm extending substantially parallel to said reference line, a transformation graph member secured to said arm and carrying thereon a transformation graph adapted to be imposed against said reference graph and said data graph, and means for measuring the relative position of said transformation member on said reference member.

13. Graph transformation apparatus comprising a stationary support having a flat surface adapted to have imposed thereon a data graph, the abscissae of said data graph extending generally from left to right when viewed by a human operator seated at the support; elongate guide means mounted on said support and disposed substantially horizontal and parallel to the direction of the data graph; means for mounting at least one end of said elongate guide means for movement toward and away from the data graph imposed on said surface, an indexed guide member secured to said movable end of said elongate guide means and disposed along an edge of said support, whereby said elongate guide means may be adjusted in accurate parallelism with the abscissae of said data graph, a reference member mounted on said guide means and movable longitudinally back and forth therealong, a first knob on said reference member manually rotatable by the operator, means for moving said reference member back and forth along said guide means in response to rotation of said first knob, said reference member having a portion projecting over said flat surface and carrying a reference line generally transverse of a left to right direction of said data graph, said reference line being registrable against said data graph, a transformation member movably mounted on said reference member and having a transformation graph member carrying a transformation graph adapted to be registered against said reference graph and said data graph, a second knob on said reference member manually rotatable by the operator, means for moving said transformation member with respect to said reference member in response to rotation of said second knob, and means for measuring the relative position of said transformation member on said reference member.

14. Graph transformation apparatus comprising a stationary support having a flat surface adapted to have imposed thereon a data graph, said data graph extending generally from left to right when viewed by a human operator seated at the support; elongate guide means mounted on said support and disposed substantially horizontal and parallel to the direction of the data graph; a reference member pivotally mounted on said guide means and movable longitudinally back and forth therealong and pivotable about the axis thereof, a first knob on said reference member manually rotatable by the operator, means for moving said reference member back and forth along said guide means in response to rotation of said first knob, said reference member having a portion projecting over said flat surface and carrying a reference line generally transverse of a left to right direction of said data graph, said reference line being registrable against said data graph, the pivotal mounting of said reference member permitting said reference line carrying portion to be tilted away from said flat surface to permit ready insertion of a sheet carrying said data graph between said flat surface and said portion, a transformation member movably mounted on said reference member and having a transformation graph member carrying a transformation graph adapted to be registered against said reference graph and said data graph, a second knob on said reference member manually rotatable by the operator, means for moving said transformation member with respect to said reference member in response to rotation of said second knob, and means for measuring the relative position of said transformation member on said reference member.

15. Apparatus comprising a substantially flat support adapted to have imposed thereon a sheet carrying a two-dimensional representation, a pair of elongate cylindrical anchoring members, one at each side of said support, means for pivotally mounting said members at one end for pivoting on an axis transverse of the axis of said members, thereby to permit said members to be tilted away from said support for insertion of a sheet carrying a two-dimensional representation, each of said members having therein a ferromagnetic member, said support having corresponding ferromagnetic members facing said first mentioned ferromagnetic members, at least one of each facing pair of said ferromagnetic members being permanently magnetized to hold the elongate members firmly against the support, each of said members having a handle for rotating the member, thereby to break the magnetic seal and permit easier separation of said members from said support.

16. Graph transformation apparatus comprising a stationary data support having a flat surface adapted to have imposed thereon a data graph, the abscissae of said data graph extending generally from left to right when viewed by a human operator seated at the support, an elongate guide member mounted on said support and disposed substantially horizontal and parallel to the direction of the data graph, means for mounting at least one end of said elongate guide member for movement toward and away from the data graph imposed on said surface, whereby said elongate guide member may be adjusted in accurate parallelism wih the abscissae of said data graph, a reference member mounted on said guide member and movable longitudinally back and forth therealong, a portion of said reference member projecting over said flat surface and carrying a reference line generally transverse of the left to right direction of said data graph, said reference line being imposable against said data graph, a transformation member movably mounted on said reference member for back and forth movement parallel to said guide member, said transformation member including an arm extending substantially parallel to said reference line, a transformation graph member secured to said arm and carrying thereon a transformation graph adapted to be imposed against said reference graph and said data graph, and means for measuring the relative position of said transformation member on said reference member.

17. Graph transformation apparatus comprising a stationary support having a flat surface adapted to have imposed thereon a data graph, the abscissae of said data graph extending generally from left to right when viewed by a human operator seated at the support; elongate guide means mounted on said support and disposed substantially horizontal and parallel to the direction of the data graph; means for mounting at least one end of said elongate guide means for movement toward and away from the data graph imposed on said surface, whereby said elongate guide means may be adjusted in accurate parallelism with the abscissae of said data graph, a reference member mounted on said guide means and movable longitudinally back and forth therealong, a first knob on said reference member manually rotatable by the operator, means for moving said reference member back and forth along said guide means in response to rotation of said first knob, said reference member having a portion projecting over said flat surface and carrying a reference line generally transverse of a left to right direction of said data graph, said reference line being registrable against said data graph, a transformation member movably mounted on said reference member and having a transformation graph member carrying a transformation graph adapted to be registered against said reference graph and said data graph, a second knob on said reference member manually rotatable by the operator, means for moving said transformation member with respect to said reference member in response to rotation of said second knob, and means for measuring the relative position of said transformation member on said reference member.

References Cited in the file of this patent

UNITED STATES PATENTS

| | | |
|---|---|---|
| 1,237,385 | Randolph | Aug. 21, 1917 |
| 1,736,342 | Giehler | Nov. 19, 1929 |
| 2,177,905 | McKeehan | Oct. 31, 1939 |

(Other references on following page)

UNITED STATES PATENTS

| | | |
|---|---|---|
| 2,312,154 | Fischer | Feb. 23, 1943 |
| 2,469,129 | Reimann | May 3, 1949 |
| 2,503,043 | Gruen | Apr. 4, 1950 |
| 2,535,942 | Lewis et al. | Dec. 26, 1950 |
| 2,566,247 | Pierce et al. | Aug. 28, 1951 |
| 2,569,328 | Omberg | Sept. 25, 1951 |
| 2,614,327 | Russell | Oct. 27, 1952 |
| 2,618,860 | Engelhart | Nov. 25, 1952 |
| 2,686,099 | Bomberger | Aug. 10, 1954 |
| 2,686,633 | Hale | Aug. 17, 1954 |

FOREIGN PATENTS

| | | |
|---|---|---|
| 589,589 | Great Britain | June 24, 1947 |

OTHER REFERENCES

Hemmendinger: "A Transformation Pantograph for the Reduction of Microphotometer Tracings," Review of Scientific Instruments, June 1938, vol. 9, pages 178–179, copy in library.

Beals: "A Semi-Automatic Intensitometer for the Reduction of Microphotometer Tracings," Journal Royal Astronomical Society of Canada, vol. 38, pages 65–75, 1944, copy in 33–18A.

Weissler et al.: Publication, "A Semi-Automatic Computer with Use in Spectroscopy," The Review of Scientific Instruments, vol. 23, number 5, pages 209–212, May 1952, copy in 235–61B.